United States Patent
Tanaka et al.

(10) Patent No.: US 7,978,418 B2
(45) Date of Patent: Jul. 12, 2011

(54) OPTICAL DEVICE AND LENS ASSEMBLY

(75) Inventors: Hirokazu Tanaka, Otsu (JP); Funabiki Nobuo, Otsu (JP)

(73) Assignee: Nippon Electric Glass Co., Ltd., Shiga (JP)

(*) Notice: Subject to any disclaimer, the term of this patent is extended or adjusted under 35 U.S.C. 154(b) by 152 days.

(21) Appl. No.: 12/226,873

(22) PCT Filed: Apr. 10, 2007

(86) PCT No.: PCT/JP2007/057903
§ 371 (c)(1),
(2), (4) Date: Oct. 30, 2008

(87) PCT Pub. No.: WO2007/145014
PCT Pub. Date: Dec. 21, 2007

(65) Prior Publication Data
US 2010/0149650 A1    Jun. 17, 2010

(30) Foreign Application Priority Data
Jun. 12, 2006 (JP) .................. 2006-162518

(51) Int. Cl.
*G02B 3/00* (2006.01)
*G02B 9/00* (2006.01)
(52) U.S. Cl. ............................................ 359/664
(58) Field of Classification Search ............. 359/664; 385/52, 68, 73
See application file for complete search history.

(56) References Cited

U.S. PATENT DOCUMENTS

| | | | |
|---|---|---|---|
| 4,919,506 A | 4/1990 | Covey | |
| 6,142,678 A | 11/2000 | Cheng | |
| 6,782,162 B2 * | 8/2004 | Fukuzawa et al. | 385/34 |
| 2002/0154872 A1 | 10/2002 | Miyokawa | |
| 2003/0077044 A1 | 4/2003 | Sakamoto et al. | |

(Continued)

FOREIGN PATENT DOCUMENTS
JP    53-148644    11/1978
(Continued)

OTHER PUBLICATIONS

International Preliminary Report on Patentability mailed Dec. 31, 2008 for International Application No. PCT/JP2007/057903.

(Continued)

*Primary Examiner* — Alicia M Harrington
(74) *Attorney, Agent, or Firm* — Wenderoth, Lind & Ponack, L.L.P.

(57) ABSTRACT

The optical device includes a first capillary tube assembly including a capillary tube into which an optical fiber is inserted and fixed, and a retaining sleeve for retaining the capillary tube; a second capillary tube assembly including a capillary tube into which optical fibers are inserted and fixed, and a retaining sleeve for retaining the capillary tube; and a lens assembly including a first lens that faces a forward end face of a first optical fiber with a gap therebetween, a second lens facing end faces of optical fibers with a gap therebetween, a band pass filter interposed between the first lens and the second lens, and an accommodation member for receiving the first and second lenses and the band pass filter. The retaining sleeve of the first capillary tube assembly is secured to one end surface of the accommodation member, and the retaining member of the second capillary tube assembly is secured to another end surface of the accommodation member.

8 Claims, 4 Drawing Sheets

U.S. PATENT DOCUMENTS

| | | |
|---|---|---|
| 2003/0138204 A1 | 7/2003 | Zhou et al. |
| 2003/0215766 A1 | 11/2003 | Fischer et al. |
| 2006/0182390 A1 | 8/2006 | Ji |

FOREIGN PATENT DOCUMENTS

| | | |
|---|---|---|
| JP | 56-7912 | 1/1981 |
| JP | 2-248905 | 10/1990 |
| JP | 08-189864 | 7/1996 |
| JP | 2002-174748 | 6/2002 |
| JP | 2002-182061 | 6/2002 |
| JP | 2002-318329 | 10/2002 |
| JP | 2003-121681 | 4/2003 |
| JP | 2003-344697 | 12/2003 |
| JP | 2004-271894 | 9/2004 |
| JP | 2004-279708 | 10/2004 |
| JP | 2005-010372 | 1/2005 |
| JP | 2005-024928 | 1/2005 |

OTHER PUBLICATIONS

Written Opinion of the International Searching Authority mailed Dec. 31, 2008 for International Application No. PCT/JP2007/057903.

Chinese Office Action issued Jan. 22, 2010 in corresponding Chinese Application No. 200780016202.3 w/translation.

International Search Report mailed May 15, 2007 for International Application No. PCT/JP2007/057903.

Chinese Office Action issued Sep. 7, 2010 in corresponding Chinese Patent Application 200780016202.3 with partial English translation.

* cited by examiner

OPTICAL DEVICE AND LENS ASSEMBLY

TECHNICAL FIELD

The present invention relates to an optical device such as an optical multiplexer/demultiplexer, an optical isolator, an optical circulator, an optical switch, and an optical gain equalizer, which are used in an optical communication system, and a lens assembly for use in the optical device.

BACKGROUND ART

As an optical device of this type, there is known an optical device in which two capillary tube/lens assemblies each having a capillary tube, to which an end portion of an optical fiber is fixed, and a lens, which are fixed to a common sleeve by adhesive or the like, are provided and fixed to an inside of an accommodation member (cylindrical member or cabinet) so that the lenses are opposed to each other through an intermediation of an optical functional component (such as optical filter or optical isolator core) (for example, the following Patent Documents 1 to 4). The lens has functions of collimating light emitted from the optical fiber into parallel and of collecting the parallel light to allow the collected light to enter into the optical fiber. As the lens, for example, there may be used: a cylindrical lens of a gradient refractive index type (so-called GRIN lens: one end is a vertical surface perpendicular to an optical axis, and the another end is an inclined surface in many cases); a cylindrical lens having a uniform refractive index, in which two partial spherical lens surfaces having the same center curvature are provided on both ends (so-called drum lens); a cylindrical lens having the uniform refractive index, in which the partial spherical lens surface is provided on one end (so-called C lens: the another end is an inclined surface in many cases), and an aspherical lens.

Further, in Patent Document 5 described below, in order to enable optical axis adjustment between an optical fiber and a lens, a capillary tube assembly in which a capillary tube (ferrule) to which an end portion of the optical fiber is fixed is embedded in a recessed portion of a sleeve and a lens assembly in which a lens fixed to an inside of a cylindrical bush are manufactured, relative positions of the capillary tube assembly and the lens assembly are adjusted, to thereby perform optical axis adjustment between the optical fiber and the lens, and then an end surface of the sleeve and an end surface of the cylindrical bush are fixed to each other. A leading end surface of the optical fiber and an end surface of the capillary tube retaining the optical fiber is polished to form a spherical shape and the capillary tube is pressed by the sleeve, thereby allowing the leading end surface of the optical fiber to be brought into physical contact (PC contact) with an incident/emission surface of the lens. As the lens, the GRIN lens is used. Besides, a filter serving as the optical functional component is fixed to a member (base member 7b) which is separate from the lens assembly to be interposed between lens assemblies which are opposed to each other.

Further, in the following Patent Document 6, various optical components such as a band pass filter and the optical isolator are each fixed to a separate cylindrical sleeve having an outer diameter corresponding thereto, to thereby produce a plurality of elements. Using a marker for position alignment formed on the cylindrical sleeve of the respective elements, the respective elements are aligned in positions with each other to be laminated and fixed (cylindrical main body). Then, the capillary tube assembly (ferrule assembly) is subjected to optical axis adjustment in X, Y, Z-axis directions and is fixed to one end of the cylindrical main body thus produced. An element having a spherical lens is subjected to the optical axis adjustment in the X, Y, Z-axis directions and is fixed to the another end of the cylindrical main body, and further an element having a capillary tube assembly (ferrule assembly) is subjected to the optical axis adjustment in the X, Y, Z-axis directions to be fixed. In addition, there is disclosed as the above-mentioned element an element in which an aspherical lens is press-fitted and fixed into the lens holder and a band pass filter are fixed to the cylindrical sleeve (FIG. 2A of Patent Document 6).

[Patent Document 1] JP 2002-182061 A
[Patent Document 2] JP 2003-344697 A
[Patent Document 3] JP 2005-10372 A
[Patent Document 4] JP 2005-24928 A
[Patent Document 5] JP 2004-271894 A
[Patent Document 6] JP 2003-121681 A

DISCLOSURE OF THE INVENTION

Problems to be Solved by the Invention

In the optical device having a structure in which two capillary tube/lens assemblies are fixed to an inside of the accommodation member so that the lenses are opposed to each other through an intermediation of an optical functional component, a light axis of input/output light is misaligned in many cases with a center axis of the sleeve in each of the capillary tube/lens assemblies. For that reason, while in a state in which each of the capillary tube/lens assemblies is inserted to an inside of the accommodation member to which the optical functional component is fixed in advance, it is necessary to adjust a position of each of the capillary tube/lens assemblies to obtain an optimum optical alignment state. Then, in order to achieve the position adjustment, it is necessary to secure a relatively large gap (diameter difference) between an outer periphery of each of the capillary tube/lens assemblies and an inner periphery of the accommodation member. As a result, when the outer periphery of the sleeve of each of the respective capillary tube/lens assemblies is fixed by adhesive to the inner periphery of the accommodation member, a relatively large amount of adhesive enters the gap. Accordingly, due to shrinkage by curing or aged deterioration of the adhesive, there was a case where high reliability may not be obtained in terms of performances such as optical characteristics and weather resistance of the optical device being a finished product.

In particular, recently, in a field of optical communication, along with development of a multimedia information society, needs with respect to high-speed optical communication, wavelength division multiplexing communication (WDM), dense wavelength division multiplexing communication (DWDM), and the like are increasing. With respect to optical devices used in those communication systems, there is an increasing demand for improving reliability under conditions in which light of higher energy is input and output. Use of the adhesive of a relatively large amount in the optical device of this type results in increase a fear of heat deterioration of the adhesive along with a temperature rise of the optical device due to high energy input/output light. Further, when the adhesive is in an optical path of the input/output light, depending on conditions, the adhesive may not withstand the high energy of the input/output light, and hence there may be predicted that there is a fear of causing damages such as burnout.

Further, the lens and the sleeve, and the sleeve and the accommodation member are fixed to each other, respectively, and hence if a stress caused by difference in a thermal expansion amount or a contraction amount between the respective members is concentrated into the lens, refractive index thereof partially changes, resulting in deviation of optical characteristics of the lens.

Besides, the optical device described in Patent Document 5 has a structure in which two lenses and an optical functional component (filter) each are assembled individually, and if right and left base members (7a and 7b) and right and left capillary tube assemblies are included in calculation, total six elements are laminated and fixed to each other. Moreover, the optical fiber has such a structure that, while in a state in which an end surface of the sleeve of the capillary tube assembly is joined to an end surface of a cylindrical bush of the lens assembly, a leading end surface of the optical fiber is allowed to have a PC contact with an input/output surface of the lens, and further, a distance in an axial direction between the leading end of the optical fiber and a filter (17) is determined based on sizes in an axial direction between the lens and the cylindrical bush and the base members (7a and 7b), respectively. For that reason, not only being a trouble in alignment operation, but also being a less degree of freedom in adjusting positions of the respective elements, it is necessary to process structural components of the respective elements with high precision in order to obtain the optimum optical alignment state. As a result, a manufacturing cost thereof increases.

In the optical device described in Patent Document 6, respective cylindrical sleeves of a plurality of elements including various optical components such as a band pass filter and an optical isolator are formed into the same outer diameter dimension, and the alignment is performed using markers on the outer diameter of the respective cylindrical sleeves to obtain the optical alignment state of the various optical components. For that reason, coaxiality between the outer periphery and the inner periphery of the respective cylindrical sleeves and axial dimensions thereof, and fixation positions of the respective optical components with respect to the respective cylindrical sleeves are necessary to be controlled with high precision, resulting in the manufacturing cost increase.

It is an object of the present invention to provide an optical device with a high reliability in performances such as optical characteristics and weather resistance.

It is another object of the present invention is to provide an optical device of which manufacturing cost may be reduced.

Means for Solving the Problems

In order to solve the above-mentioned problems, there is provided an optical device including: a first capillary tube assembly including: a capillary tube into which an optical fiber is inserted and fixed; and a retaining member for retaining the capillary tube; a second capillary tube assembly including: a capillary tube into which an optical fiber is inserted and fixed; and a retaining member for retaining the capillary tube; and a lens assembly including: a first lens that faces a leading end of the optical fiber with a gap between the first capillary tube assembly; a second lens that faces a leading end of the optical fiber with a gap between the second capillary tube assembly; an optical functional component interposed between the first lens and the second lens; and an accommodation member for accommodating those components, in which: the retaining member of the first capillary tube assembly is fixed to one end surface of the accommodation member; and the retaining member of the second capillary tube assembly is fixed to the another end surface of the accommodation member The optical device according to the present invention has such a structure that the first capillary tube assembly and the second capillary tube assembly each are fixed to both end surfaces of the accommodation member of the lens assembly receiving the first lens, the second lens, and the optical functional component. Accordingly, when adjusting the positions of the first capillary tube assembly and the second capillary tube assembly with respect to the lens assembly so as to be an optimum optical alignment state, movement of the capillary tube assembly to an adjustment position is not limited by the inner periphery of the accommodation member. Therefore, compared to the conventional optical device, it is not necessary to secure a large gap in the inner periphery of the accommodation member for alignment, and hence it is possible to reduce the amount of adhesive for fixing the lens and the optical functional component. Owing to this, deterioration of the optical characteristics, the weather resistance, and the like of the optical device, which are caused by the shrinkage by curing or aged deterioration of the adhesive, may be suppressed, and the optical device with high reliability may be constructed. In addition, the degree of freedom for position adjustment of the first capillary tube assembly and the second capillary tube assembly with respect to the lens assembly is relatively large, and hence without processing the respective components with high precision over necessary, it is possible to obtain the optimum optical alignment state, and further it is possible to relatively easily conduct the optical alignment operation. Thereby, it is possible to reduce the manufacturing cost.

The optical functional component herein means an optical filter (such as band pass filter, long wavelength transmission/reflection filter, short wavelength transmission/reflection filter, or gain equalizer filter for correction), an optical isolator core, or the like.

Each of the first lens and the second lens has a function of collimating light emitted from the optical fiber into parallel light and collecting the parallel light to allow the collected light to enter into the optical fiber. Further, the first lens and the second lens may be the above-mentioned GRIN lens, a drum lens, a C lens, or an aspherical lens. However, it is preferred that one or both of those be preferably lenses manufactured by processing a part of a hemispherical lens into a flat surface portion (hereinafter, thus manufactured lens is referred to as hemispherical lens). The hemispherical lens has a spherical portion (partially spherical surface) where the above-mentioned flat surface portion and a part of the spherical portion of the sphere lens are left as they are. It is preferred that a length (L) of a line extending from a vertex of the spherical surface of the spherical surface portion to the flat surface portion through the curvature center in the hemispherical lens be equal to or larger than a curvature radius (R: radius of spherical lens) of the spherical surface portion. By doing so, an acute angle portion is not formed in a boundary between the spherical surface portion and the flat surface portion, and hence the damages such as crack are not liable to cause in the hemispherical lens. Further, the hemispherical lens may be handled more easily by using a gripping tool such as tweezers. Note that, the flat surface portion constitutes a surface perpendicular to the above-mentioned line.

The hemispherical lens has such an advantage that, compared to the GRIN lens or the like, only by changing a shape or a material (kind or composition of material) of the lens, such as the curvature radius (R: radius of spherical lens) of the spherical portion, or the length (L) of the line, optical characteristics of the hemispherical lens may easily be changed. Further, the spherical lens serving as the material may be manufactured with high accuracy, and hence the hemispherical lens obtained by processing the spherical lens may be manufactured with high accuracy and at relatively low costs.

It is preferred that the hemispherical lens be arranged so that the flat surface portion faces to the leading end of the optical fiber of the capillary tube assembly, more preferably, be arranged so that the flat surface portion is perpendicular to the light axis of the optical fiber. In the hemispherical lens described above, compared to a drum lens having the same refractive index and the same focal distance, a gap volume between the leading end of the optical fiber may be increased, and hence it is effective to reduce influences of reflected return light to the optical fiber. Further, by arranging the hemispherical lens so that the flat surface portion is perpendicular to the light axis of the optical fiber, it is possible to prevent or suppress inclination shift of the light axis in the flat surface portion caused by the refraction of light passing through the lens.

The hemispherical lens described above may be directly fixed to the accommodation member of the lens assembly. However, it is preferred that the hemispherical lens be fixed to the lens holder having the through hole. Specifically, while in a state in which the spherical surface portion of the hemispherical lens abuts against the edge portion on one end side of the through hole of the lens holder, the hemispherical lens is fixed to the lens holder by adhesive, or the like. By the abutment of the spherical surface portion of the hemispherical lens to the edge portion of the one end side of the through hole of the lens holder, the center curvature of the spherical surface portion of the hemispherical lens may easily be aligned with the center of the through hole of the lens holder. Note that, the size and shape of the through hole of the lens holder may appropriately be determined within such a range that the alignment action described above may be obtained. For example, as the shape of the through hole, there may employed a circular, a regular polygon (equilateral triangle, square, regular hexagon, etc.).

Further, by controlling the coaxiality between the outer periphery of the lens holder and the center of the through hole, and the perpendicularity between the end surface and the outer periphery, and by fixing the controlled lens holder to the accommodation member by adhesive, or the like, the center curvature of the hemispherical lens fixed to the lens holder may be aligned with or may be substantially aligned with the center axis of the accommodation member. Owing to this, the following alignment operation of the capillary tube assembly becomes easier. Further, in this case, the hemispherical lens is fixed to the one end side of the lens holder, but is not directly fixed to the accommodation member, and hence even if the difference causes in the thermal expansion amount or the contraction amount between the hemispherical lens, the lens holder, and the accommodation member, respectively, such a stress causing the deviation of the optical characteristics does not act on the hemispherical lens.

The optical functional component may be fixed to the another end side of the lens holder. For example, by employing an assembling method involving fixing the hemispherical lens to the one end side of the lens holder, preparing in advance the assembly body the another end side of which the optical functional component is fixed to, receiving the assembly body in the accommodation member, and after the position adjustment, fixing the lens holder to the accommodation member, simplification of the assembling operation may be attained. Further, the through hole of the lens holder becomes a light path, even in the case where the optical functional component is fixed to the lens holder by adhesive, the adhesive does not enter into the light path. In addition, the distance between the hemispherical lens and the optical functional component may easily be set with a good accuracy by controlling a thickness of the lens holder in the light axis direction.

Further, according to the present invention, in order to solve the above-mentioned problems, there is provided a lens assembly including: a lens which is formed by processing a part of a spherical lens into a flat surface portion; a lens holder having a through hole; and an accommodation member for receiving those components, in which the lens is fixed to the lens holder in such a state that the spherical surface portion of the lens abuts an edge portion of one end side of the through hole of the lens holder.

In the above-mentioned structure, it is preferred that the lens be arranged so that the flat surface portion is in parallel with one end of the accommodation member.

Further, there may be employed a structure in which an optical functional component is received within the accommodation member in adjacent to another end side of the lens holder. In this case, the optical functional component may be fixed to another end side of the lens holder. In addition, the lens holder may be fixed to the accommodation member.

Further, there may be employed a structure in which a second lens holder having the through hole and a second lens formed by processing a part of the spherical lens into the flat surface portion are received in the accommodation member in adjacent to the optical functional component in the stated order; and the second lens is fixed to the second lens holder in such a state that the spherical surface portion of the lens abuts an edge portion of another end side of the through hole of the lens holder. In this case, the second lens holder may be fixed to the accommodation member. Further, it is preferred that the second lens be arranged so that the flat surface portion is in parallel with the another end surface of the accommodation member.

Effects of the Invention

According to the present invention, the optical device with high reliability in terms of performances such as optical characteristics and weather resistance may be provided.

Further, according to the present invention, the optical device which is less expensive may be provided by reducing the manufacturing costs.

BEST MODE FOR CARRYING OUT THE INVENTION

Hereinafter, embodiments of the present invention will be described with reference to the drawings.

FIG. 1 shows a schematic structure of an optical device 1 according to a first embodiment of the present invention. The optical device 1 has a structure in which a single-core collimator and a double-core collimator are combined with each other. The optical device 1 may be used for wavelength division multiplex (WDM) or the like.

The optical device 1 includes as main components, a first capillary tube assembly 2, a second capillary tube assembly 3, and a lens assembly 4.

The first capillary tube assembly 2 includes a capillary tube 6 made of glass, in which one optical fiber 5 is fixed by adhesive in an inner hole of a single core, and a retaining sleeve 11 made of glass, which is coaxially fitted to an outer periphery of the capillary tube 6 and fixed thereto by adhesive. The leading end surface 5a of the optical fiber 5 and the leading end surface 6a of the capillary tube 6 are subjected to polishing to form the same inclined surface inclined with respect to the optical axis of the optical fiber 5. As a result, return light reflected by the leading end of the optical fiber 5 is suppressed. Further, on the leading end surface 5a of the optical fiber 5, there is formed an antireflection film. A one end surface 7a of a retaining sleeve 7 is formed to be a surface perpendicular to the optical axis of the optical fiber 5. A perpendicularity of the end surface 7a is controlled with an accuracy of, for example, ±0.5 degrees or less, preferably, ±0.1 or less degrees with respect to a geometrically ideal flat surface in which the optical axis of the optical fiber 5 serves as the normal line.

The second capillary tube assembly 3 includes a capillary tube 7 made of glass, in which two optical fibers 8 and 9 are fixed by adhesive to inner holes of two cores, respectively, and a retaining sleeve 11 made of glass, coaxially fitted to an outer periphery of a capillary tube 10 and fixed thereto by adhesive or the like. Leading end surfaces 8a and 9a of the optical fibers 8 and 9 and an leading end surface 10a of the capillary tube 10 are subjected to polishing so as to form the same inclined surface inclined with respect to optical axes of the optical fibers 8 and 9. As a result, return light reflected by ends of the optical fibers 8 and 9 are suppressed. Further, on each of the leading end surfaces 8a and 9a of the optical fibers 8 and 9, there is formed an antireflection film. A one end surface 11a of the retaining sleeve 1 is formed to be a surface perpendicular to the optical axes of the optical fibers 8 and 9. The perpendicularity of the end surface 11a is controlled with an accuracy of, for example, ±0.5 degrees or less, preferably, ±0.1 degrees or less with respect to a geometrically ideal flat surface in which the optical axes of the optical fibers 5 and 6 serve as normal lines.

The lens assembly 4 includes, as main components thereof, a first lens 12 opposed to the leading end surface 5a of the optical fiber 5 of the first capillary tube assembly 2 via a gap, a second lens 13 opposed to the leading end surfaces 8a and 9a of the optical fibers 8 and 9 of the second capillary tube assembly 3 via a gap, an optical functional component interposed between the first lens 12 and the second lens 13, for example, an optical filter, particularly, a band pass filter 14, and an accommodation sleeve 15 made of glass, for accommodating those components.

As shown in an enlarged view of FIG. 2, in this embodiment, the first lens 12 is a lens manufactured by processing a part of a spherical lens into a flat surface portion (hemispherical lens), which has a flat surface portion 12a formed by removing a part of the spherical lens by polishing or the like and a spherical surface portion 12b which is a remaining portion of the spherical lens. A length (L1) of a line extending from a vertex of a spherical surface of the spherical surface portion 12b to the flat surface portion 12a through a curvature center (O1: spherical surface center of original spherical lens) is larger than a curvature radius (R1: radius of original spherical lens) of the spherical surface portion 12b. Further, the second lens 13 is also a lens manufactured by processing a portion of the spherical lens into the flat surface portion (hemispherical lens), which has a flat surface portion 13a formed by removing a part of the spherical lens by polishing or the like and a spherical surface portion 13b which is a remaining portion of the spherical lens. A length (L2) of a line extending from a vertex of a spherical surface of the spherical surface portion 13b to the flat surface portion 13a through a curvature center (O2: spherical surface center of original spherical lens) is larger than a curvature radius (R2: radius of original spherical lens) of the spherical surface portion 13b. Note that, in this embodiment, the first lens 12 and the second lens 13 have the lengths (L1 and L2) of the lines and the radii of curvature (R1 and R2) which are the same with each other (L1=L2, R1=R2), and the lengths (L1 and L2) of the lines and the radii of curvature (R1 and R2) have a relationship of L1 (L2)=1.2×R1 (R2).

Each of the first lens 12 and the second lens 13 is formed of, for example, optical glass of a uniform refractive index type. Examples of the optical glass may include MK-18 (manufactured by Nippon Electric Glass Co., Ltd.) having a refractive index of 1.7 or more and RH-21 (manufactured by Nippon Electric Glass Co., Ltd.) having a refractive index of 1.9 or more. Note that, for example, each of the first lens 12 and the second lens 13, which is formed of MK-18 and has a relationship of L1(L2)=1.2×R1(R2), enables increase in space amount with respect to the leading end of the optical fiber about 3.7 times larger than that of a drum lens having the same refractive index and the same focal length. Accordingly, reflected return light to the optical fiber may be reduced to about one tenth or lower of the original value. Further, on a portion of each of the flat surface portions 12a and 13a and the spherical surface portions 12b and 13b of the first lens 12 and the second lens 13, respectively, through which light passes, there is formed the antireflection film.

The first lens 12 is fixed to the accommodation sleeve 15 through the intermediation of a first lens holder 16. The first lens holder 16 is made of glass, metal, ceramic, or the like (by glass in this embodiment) into a circular ring shape, or a cylindrical shape, and has a circular through hole 16a at a center portion thereof. The first lens 12 is fixed to one end side of the first lens holder 16 by adhesive, while the spherical portion 12b abuts the edge portion of the one end side of the through hole 16a of the first lens holder 16. By the abutment of the spherical portion 12b of the first lens 12 against the edge portion of the one end side of the through hole 16a of the first lens holder 16, the center curvature (O1) of the spherical portion 12b may easily be aligned with the center of the through hole 16a of the first lens holder 16. The first lens holder 16 is controlled in its coaxiality between the outer periphery thereof and the center of the through hole 16a, and its perpendicularity between the end surface and the outer periphery are controlled, and is fixed by the outer periphery thereof to the inner periphery of the accommodation sleeve 15. By the fixation of the first lens 12 to the thus controlled first lens holder 16, while in a state in which the first lens holder 16 is fixed to the inner periphery of the accommodation sleeve 15, the center curvature (O1) of the spherical portion 12b of the first lens 12 may be aligned or may be substantially aligned with the center axis of the inner periphery of the accommodation sleeve 15. Further, the first lens 12 is fixed to the one end side of the first lens holder 16, but is not directly fixed to the inner periphery of the accommodation sleeve 15, and hence even if the difference causes in the thermal expansion amount or the contraction amount between the accommodation sleeve 15 and the first lens holder 16, such a stress causing the deviation of the optical characteristics does not act on the first lens 12.

The second lens 13 is fixed to the inner periphery of the accommodation sleeve 15 through the intermediation of a second lens holder 17. The second lens holder 17 is made of glass, metal, ceramic, or the like (by glass in this embodiment), into a circular ring shape or a cylindrical shape, and has a circular through hole 17a at a center portion thereof. The second lens 13 is fixed to another end side of the second lens holder 17 by adhesive, while the spherical portion 13b abuts the edge portion of the another end side of the through hole 17a of the second lens holder 17. By the abutment of the spherical portion 13b of the second lens 13 against the edge portion of the another end side of the through hole 17a of the second lens holder 17, the center curvature (O2) of the spherical portion 13b may easily be aligned with the center of the through hole 17a of the second lens holder 17. The second lens holder 17 is controlled in its coaxiality between the outer periphery thereof and the center of the through hole 17a, and its perpendicularity between the end surface and the outer periphery are controlled, and is fixed by the outer periphery thereof to the inner periphery of the accommodation sleeve 15. By the fixation of the second lens 13 to the thus controlled second lens holder 17, while in a state in which the second lens holder 17 is fixed to the inner periphery of the accommodation sleeve 15, the center curvature (O2) of the spherical portion 13b of the second lens 13 may be aligned or may be substantially aligned with the center axis of the inner periphery of the accommodation sleeve 15. Further, the second lens 13 is fixed to the another end side of the second lens holder 17, but is not directly fixed to the inner periphery of the accommodation sleeve 15, and hence even if the difference causes in the thermal expansion amount or the contraction amount between the accommodation sleeve 15 and the second lens holder 17, such a stress causing the deviation of the optical characteristics does not act on the second lens 13.

In this embodiment, the band pass filter 14 as the optical functional component is fixed to the one end side of the second lens holder 17 by adhesive. The band pass filter 14 faces the spherical portion 13b of the second lens 13 through the intermediation of the through hole 17a of the second lens holder 17, and also faces the spherical portion 12b of the first lens 12 through the intermediation of the through hole 16a of the first lens holder 16. Note that, the one end surface of the band pass filter 14 may be abutted against the another end surface of the first lens holder 16, and may also be apart from the another end surface. Alternatively, the band pass filter 14 may be fixed to both the second lens holder 17 and the first lens holder 16 by adhesive.

Each of one end surface 15a and the another end surface 15b of the accommodation sleeve 15 is formed into a flat surface perpendicular to a center axis of an inner periphery of the accommodation sleeve 15. The perpendicularity thereof is controlled with an accuracy of ±0.5 degree or less, preferably ±0.1 degree or less with respect to a geometrically ideal flat surface in which the center axis of the inner periphery thereof serves as the normal line. Further, the flat surface portion 12a of the first lens 12 is in parallel to the end surface 15a of the accommodation sleeve 15, and the flat surface portion 13a of the second lens 13 is in parallel to the another end surface 15b of the accommodation sleeve 15.

As shown in FIG. 1, the first capillary tube assembly 2 and the lens assembly 4 are fixed to each other by adhesive in a state where the one end surface 7a of the retaining sleeve 7 and the one end surface 15a of the accommodation sleeve 15 abut on each other. The second capillary tube assembly 3 and the lens assembly 4 are fixed to each other by adhesive in a state where the one end surface 11a of the retaining sleeve 11 and the another end surface 15b of the accommodation sleeve 15 abut on each other. The flat surface portion 12a of the first lens 12 is opposed to the leading end surface 5 of the optical fiber 5, respectively, of the first capillary tube assembly 2 via a gap. The flat surface portion 13a of the second lens 13 faces the leading end surfaces 8a and 9a of the optical fibers 8 and 9 of the second capillary tube assembly 3 via a gap.

The optical device 1 of this embodiment may be assembled as described below.

First, the second lens 13 and the band pass filter 14 are fixed to the second lens holder 17 by adhesive in the above-mentioned mode to produce an assembly body formed of those three components. Then, the flat surface portion 13a of the second lens 13 and the end surface of the second lens holder 17 (end surface of which perpendicularity with respect to the center axis is controlled) are fixed so as to be parallel or substantially parallel to each other, by appropriately pressing using a positioning jig. Then, the assemble body is inserted into the inner periphery of the accommodation sleeve 15, and after the adjustment of the position, the outer periphery of the second lens holder 17 is fixed to the inner periphery of the accommodation sleeve 15 by adhesive. Note that, the outer diameter of the second lens holder 17 and the inner diameter of the accommodation sleeve 15 are substantially matched with each other so that the second lens holder 17 of the assemble body may be smoothly inserted into the inner periphery of the accommodation sleeve 15 (clearance between the outer periphery of the second lens holder 17 and the inner periphery of the accommodation sleeve 15 is made as small as possible). By doing so, the above-mentioned assembly body may be fixed to the accommodation sleeve 15 so that the flat surface portion 13a of the second lens 13 is in parallel with the another end surface 15b of the accommodation sleeve 15, and is perpendicular or close to perpendicular to the center axis of the inner periphery of the accommodation sleeve. In addition, as described above, by the control of the coaxiality between the outer periphery of the second lens holder 17 and the center of the through hole 17a, and the perpendicularity between the end surface and the outer periphery, the center curvature (O2) of the spherical portion 13b of the second lens 13 may be aligned or substantially aligned with the center axis of the inner periphery of the accommodation sleeve 15.

Next, the first lens 12 is fixed to the first lens holder 16 by adhesive in the above-mentioned mode to produce an assembly body formed of those two components. Then, the flat surface portion 12a of the first lens 12 and the end surface of the first lens holder 16 (end surface of which perpendicularity with respect to the center axis is controlled) are fixed so as to be parallel or substantially parallel to each other, by appropriately pressing using a positioning jig. Then, the assemble body is inserted into the inner periphery of the accommodation sleeve 15, and after the adjustment of the position, the outer periphery of the first lens holder 16 is fixed to the inner periphery of the accommodation sleeve 15 by adhesive. Note that, the outer diameter of the first lens holder 16 and the inner diameter of the accommodation sleeve 15 are substantially matched with each other so that the first lens holder 16 of the assemble body may be smoothly inserted into the inner periphery of the accommodation sleeve 15 (clearance between the outer periphery of the first lens holder 16 and the inner periphery of the accommodation sleeve 15 is made as small as possible). By doing so, the above-mentioned assembly body may be fixed to the accommodation sleeve 15 so that the flat surface portion 12a of the first lens 12 is in parallel with the one end surface 15a of the accommodation sleeve 15, and is perpendicular or close to perpendicular to the center axis of the inner periphery of the accommodation sleeve. In addition, as described above, by the control of the coaxiality between the outer periphery of the first lens holder 16 and the center of the through hole 16a, and the perpendicularity between the end surface and the outer periphery, the center curvature (O1) of the spherical portion 12b of the first lens 12 may be aligned or substantially aligned with the center axis of the inner periphery of the accommodation sleeve 15.

Next, on the another end surface 15b of the accommodation sleeve 15 to which the above-mentioned assembly is fixed, the one end surface 11a of the retaining sleeve 11 of the first capillary tube assembly 3 is abutted, and relative positions of those are adjusted in directions (X-axis and Y-axis directions) perpendicular to an optical axis direction (Z-axis direction) of the optical fibers 8 and 9. At the same time, in the abutted retaining sleeve 11 of the secondary capillary tube assembly 3, the capillary tube 10 is moved in the optical axis direction (Z-axis direction), thereby adjusting the positions of the leading end surfaces 8*a* and 9*a* of the optical fibers 8 and 9 fixed to the capillary tube 10. Then, for example, adhesion and fixation are performed in an optimum optical alignment state such that, for example, light emitted from the optical fiber 8 on one side is reflected by the band pass filter 14, and is returned to the optical fiber 9 on another side.

Further, on one end surface 15*a* of the accommodation sleeve 15 to which the above-mentioned assembly is fixed, the one end surface 7*a* of the retaining sleeve 7 of the first capillary tube assembly 2 is abutted, and relative positions of those are adjusted in directions (X-axis and Y-axis directions) perpendicular to an optical axis direction (Z-axis direction) of the optical fiber 5. At the same time, in the abutted retaining sleeve 7 of the first capillary tube assembly 2, the capillary tube 6 is moved in the optical axis direction (Z-axis direction), thereby adjusting a position of the leading end surface 5*a* of the optical fiber 5 fixed to the capillary tube 6. Then, for example, adhesion and fixation are performed in an optimum optical alignment state such that, for example, light emitted from the optical fiber 8 on one side of the second capillary tube assembly 3 passes through the band pass filter 14, and is entered into the optical fiber 5.

In an assembling method for the optical device 1 described above, when all components constituting the optical device 1 is made of a transparent material (for example, resin or glass), a UV-curing adhesive may be used as the adhesive, thereby improving an operability of an assembling operation. Further, in the adhesion between the retaining sleeve 7(11) and the capillary tube 6(10), and/or the adhesion between the capillary tube assembly 2(3) and the lens assembly 4, after temporal fixation is performed by the UV-curing adhesive, fixation may be performed by a thermosetting adhesive with higher reliability.

Next, a description will be made of a use example of the optical device 1 according to this embodiment (use example as an optical demultiplexer).

For example, light of relatively different wavelengths λ1 and λ2 are emitted from the optical fiber 8 on the one side of the second capillary tube assembly 3. The band pass filter 14 has optical characteristics allowing reflection of the light of wavelength λ1 and passage of the light of wavelength λ2. The light of wavelength λ1 emitted from the optical fiber 8 of the second capillary tube assembly 3 is collimated into parallel light by the second lens 13 and is reflected by the band pass filter 14. The light of wavelength λ1 reflected by the band pass filter 14 is collected by the second lens 13 and is returned to the optical fiber 9 on another side of the second capillary tube assembly 3. On the other hand, the light of wavelength λ2 emitted from the optical fiber 8 of the second capillary tube assembly 3 is collimated into parallel light by the second lens 13 and enters the band pass filter 14. Then, the light passes through the band pass filter 14 and is collected by the first lens 12 to enter into the optical fiber 5 of the first capillary tube assembly 2.

FIG. 3 shows a schematic structure of an optical device 21 according to a second embodiment of the present invention, and FIG. 4 shows a lens assembly thereof. Note that, components and portions substantially the same as those of the optical device 1 according to the first embodiment are denoted by the same reference symbols, and a duplicate description thereof is omitted.

The optical device 21 of this embodiment substantially differs from the optical device 1 of the first embodiment in that the single core collimators are combined with each other, and the isolator core 14' is used as the optical functional component.

In the first capillary tube assembly 2, the one optical fiber 5 is fixed by adhesive to the inner hole of the single core of the capillary tube 6, and in the second capillary tube assembly 3, the one optical fiber 8 is fixed by adhesive to the inner hole of the single core 1 of the capillary tube 10'. Besides, the isolator core 14' as the optical functional component is fixed by adhesive to the one end side of the second lens holder 17. Other matters correspond to the optical device 1 of the first embodiment, and hence a duplicate description thereof is omitted.

DESCRIPTION OF SYMBOLS

Figure 1:
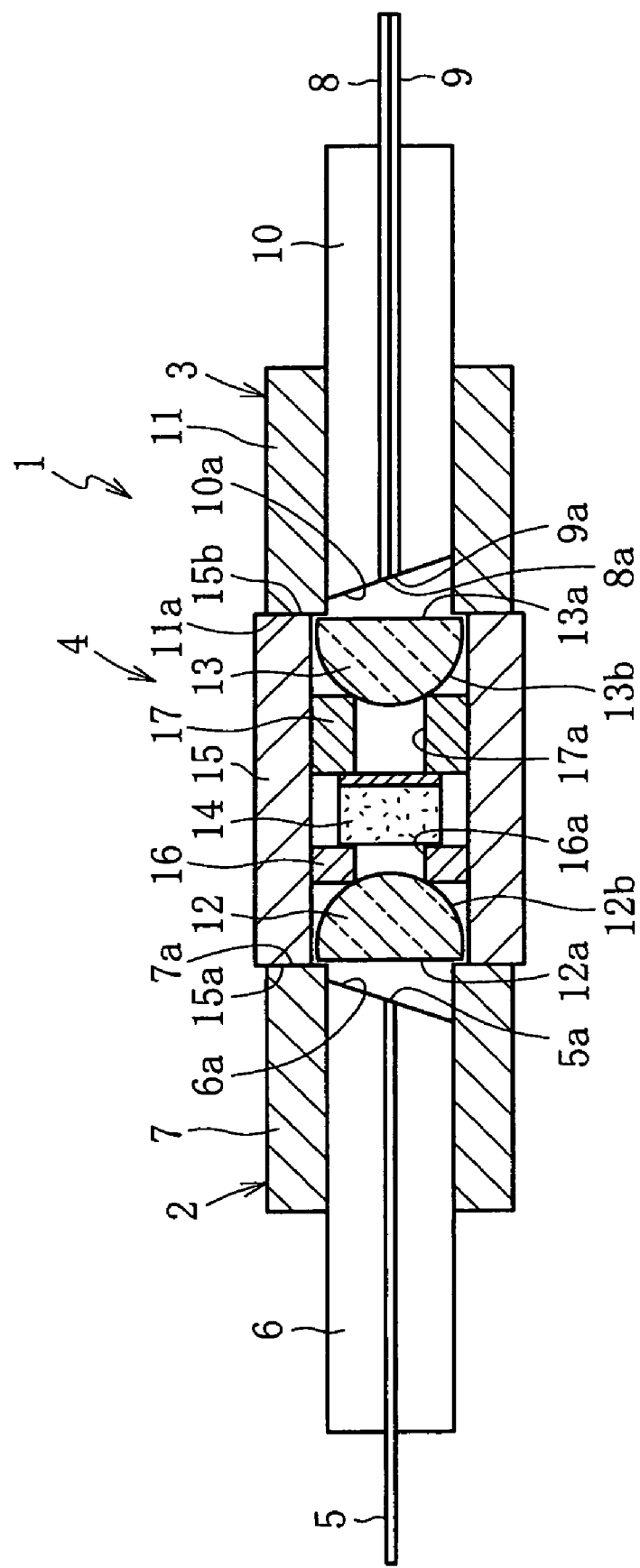
FIG. 1 A vertical sectional view showing a schematic structure of an optical device according to a first embodiment of the present invention.
Figure 2:
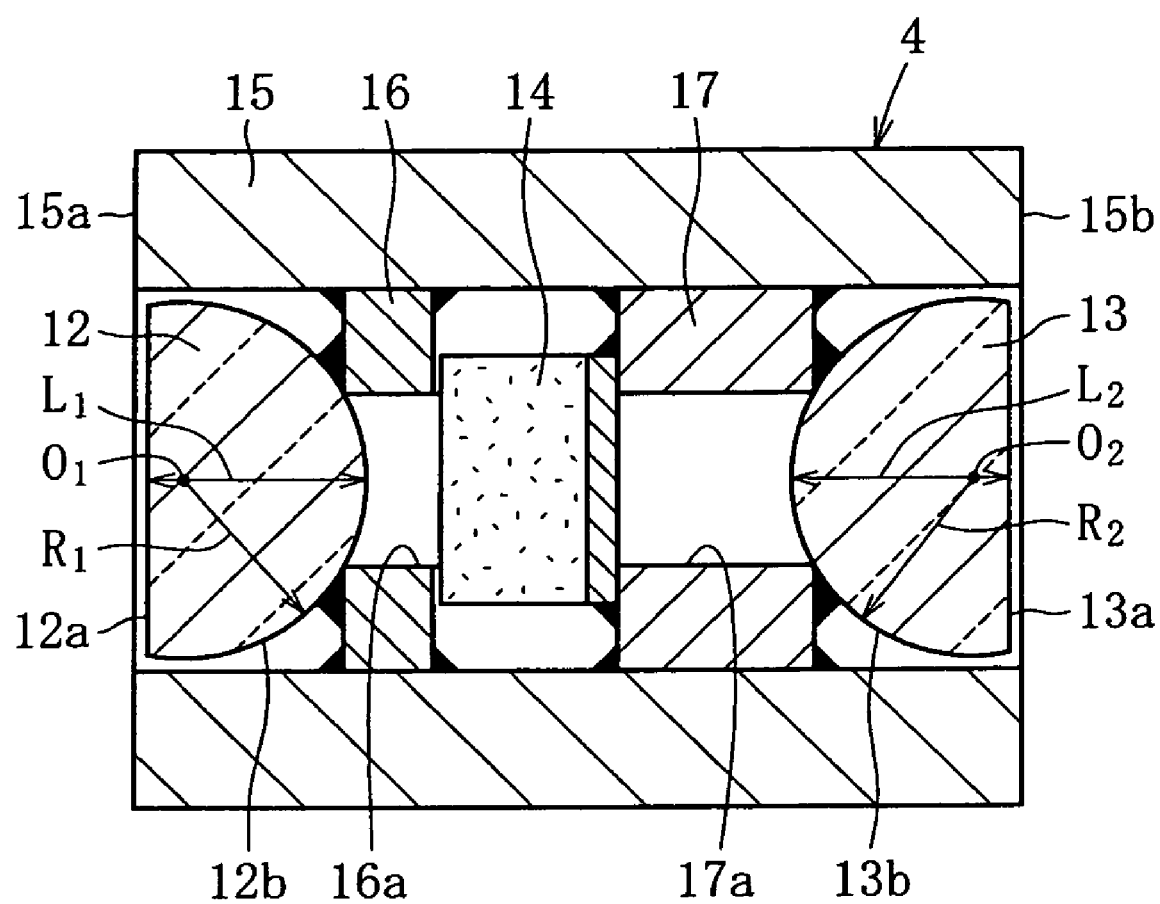
FIG. 2 A vertical side view showing a schematic structure of a lens assembly of an optical device according to a first embodiment of the present invention.
Figure 3:
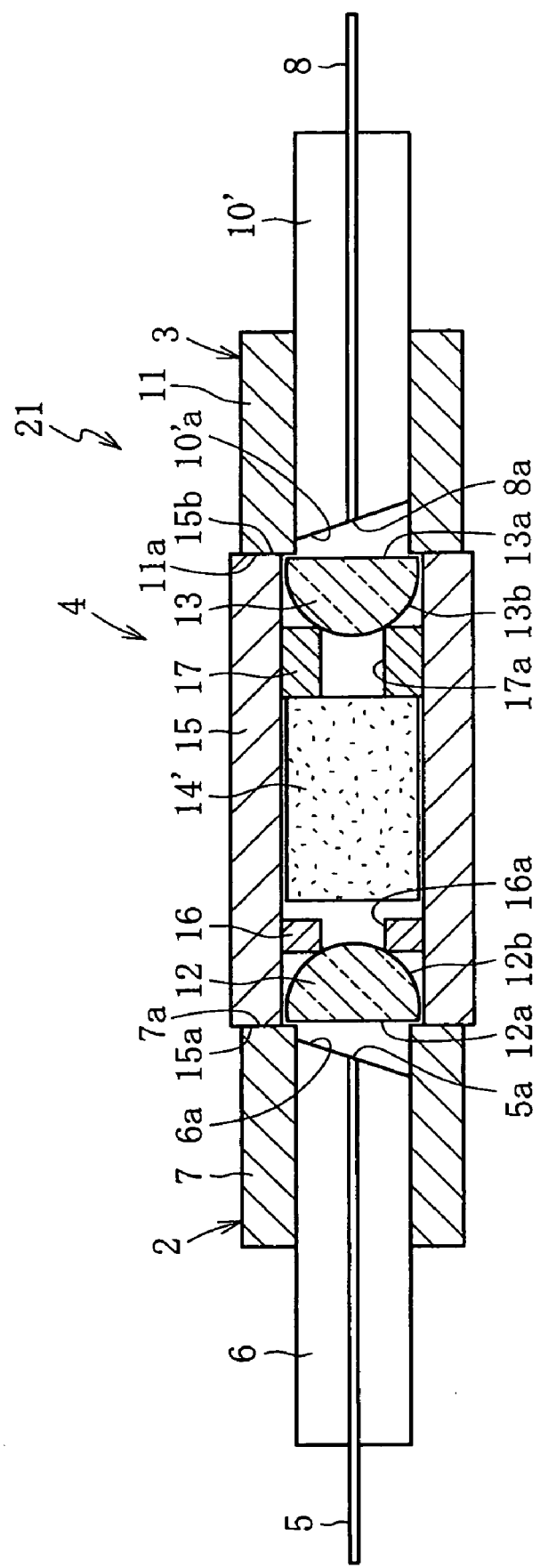
FIG. 3 A vertical sectional view showing a schematic structure of an optical device according to a second embodiment of the present invention.
Figure 4:
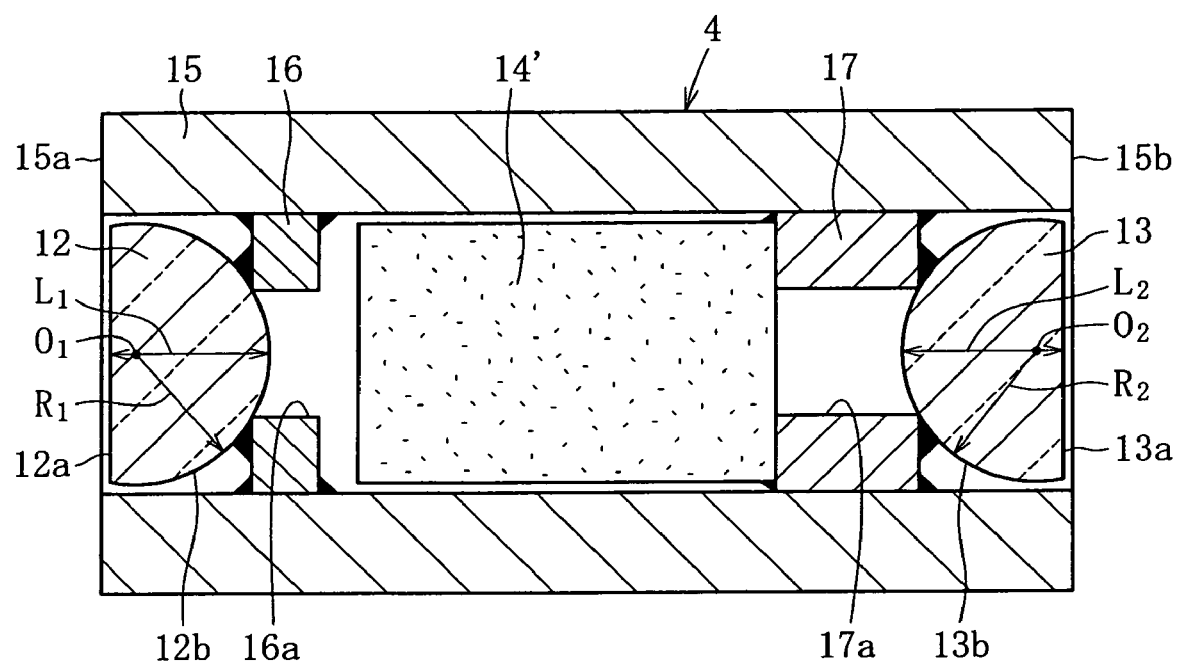
FIG. 4 A vertical side view showing a schematic structure of a lens assembly of an optical device according to a second embodiment of the present invention.

1 optical device
2 first capillary tube assembly
5 optical fiber
5*a* leading end surface
6 capillary tube
6*a* leading end surface
7 retaining sleeve
7*a* end surface
3 second capillary tube assembly
8 optical fiber
8*a* leading end surface
9 optical fiber
9*a* leading end surface
10 capillary tube
10*a* leading end surface
10' capillary tube
10'*a* leading end surface
11 retaining sleeve
11*a* end surface
4 lens assembly
12 first lens
12*a* flat surface portion
12*b* spherical surface portion
O1 curvature center
L1 length of line
R1 curvature radius
13 second lens
13*a* flat surface portion
13*b* spherical surface portion
O2 curvature center
L2 length of line
R2 curvature radius
14 band pass filter (optical functional component)
14' isolator core (optical functional component)
15 accommodation sleeve
15*a* one end surface
15*b* the another end surface 16 first lens holder
116a through hole
17 second lens holder
117a through hole

The invention claimed is:

1. An optical device comprising:
a first capillary tube assembly including a first capillary tube into which an optical fiber is inserted and fixed, and a first retaining member for retaining the first capillary tube;
a second capillary tube assembly including a second capillary tube into which an optical fiber is inserted and fixed, and a second retaining member for retaining the second capillary tube; and
a lens assembly including:
   a first lens that faces a leading end of the first capillary tube with a gap between the first lens and the first capillary tube assembly;
   a second lens that faces a leading end of the second capillary tube with a gap between the second lens and the second capillary tube assembly;
   an optical functional component interposed between the first lens and the second lens;
   a lens holder having a through hole; and
   an accommodation member for accommodating the first lens, second lens, optical functional component and the lens holder, wherein
at least one of the first lens and the second lens is a spherical lens having a flat surface portion,
the lens holder is adjacent to and fixed to the at least one of the first lens and the second lens such that a spherical surface portion of the at least one of the first lens and the second lens abuts an edge portion of one end side of the through hole of the lens holder, and
the first retaining member of the first capillary tube assembly is fixed to one end surface of the accommodation member, and the second retaining member of the second capillary tube assembly is fixed to another end surface of the accommodation member.

2. An optical device according to claim 1, wherein the at least one of the first lens and the second lens is arranged so that the flat surface portion faces a leading end of the optical fiber.

3. An optical device according to claim 1, wherein the optical functional component is fixed to another end side of the lens holder.

4. An optical device according to claim 1, wherein the lens holder is fixed to the accommodation member.

5. A lens assembly comprising:
a first spherical lens having a flat surface portion;
a second spherical lens having a flat surface portion;
a first lens holder having a through hole;
a second lens holder having a through hole;
an accommodation member for accommodating the first and second spherical lenses and the first and second lens holders; and
an optical functional component located within the accommodation member, wherein
the first spherical lens is fixed to the first lens holder such that a spherical surface portion of the first spherical lens abuts an edge portion of one end side of the through hole of the first lens holder,
the second spherical lens is fixed to the second lens holder such that a spherical surface portion of the second spherical lens abuts an edge portion of another end side of the through hole of the second lens holder,
the optical functional component is adjacent to another end side of the first lens holder, and
the second lens holder is adjacent to the optical functional component and between the optical functional component and the second spherical lens.

6. A lens assembly according to claim 5, wherein the second spherical lens is arranged so that the flat surface portion is parallel with another end surface of the accommodation member.

7. A lens assembly according to claim 5, wherein the second lens holder is fixed to the accommodation member.

8. A lens assembly according to claim 5, wherein the first and second lens holders are fixed to the accommodation member.

* * * * *